May 19, 1942.  W. W. SLOANE  2,283,825
SHAKER CONVEYER TROUGH AND CONNECTING MEANS THEREFOR
Filed April 13, 1940
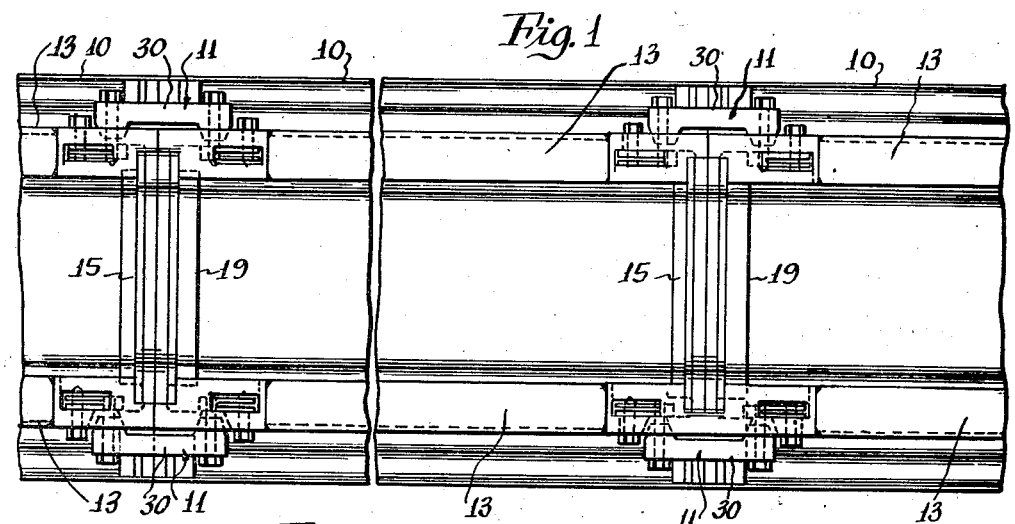
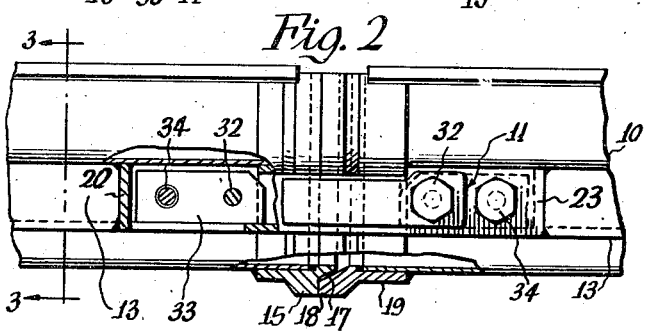
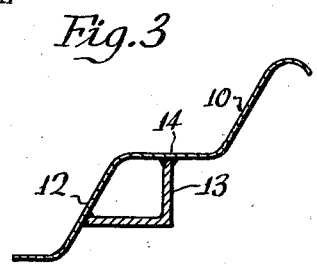
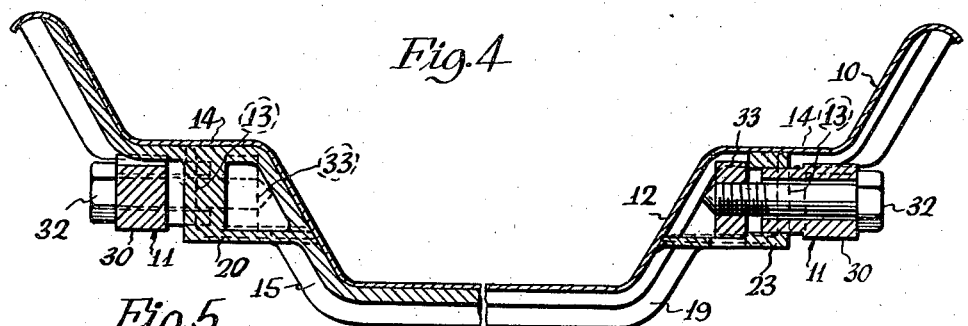
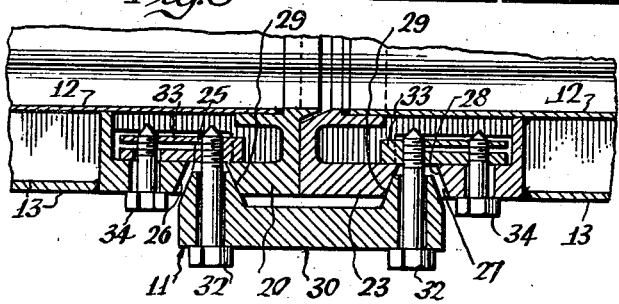
INVENTOR
William W. Sloane
BY
Clarence F. Poole
ATTORNEY Patented May 19, 1942

2,283,825

UNITED STATES PATENT OFFICE 2,283,825

SHAKER CONVEYER TROUGH AND CONNECTING MEANS THEREFOR

William W. Sloane, Chicago, Ill., assignor to Goodman Manufacturing Company, Chicago, Ill., a corporation of Illinois Application April 13, 1940, Serial No. 329,424

13 Claims. (Cl. 198—220)

This invention relates to improvements in shaker conveyer troughs and connecting means therefor.

Among the objects of my invention are to provide a new and improved form of shaker conveyer trough and connecting means therefor, so arranged as to minimize breakage of the troughs by taking the stresses in the trough line directly through the means for connecting the troughs together.

Another object of my invention is to provide an improved form of connector for connecting the troughs of a shaker conveyer trough line together including means extending along opposite sides of each trough section, which with the trough sections form reinforcing columns, so the load during operation of the conveyer may be taken directly through said columns and connecting means.

A further object of my invention is to provide a novel form of wedge-like readily detachable connector for the troughs of a shaker conveyer trough line, which is of a more rugged, simplified and efficient construction than formerly.

A more specific object of my invention is to provide a new and improved form of shaker conveyer trough and connector for the troughs of the trough line, which includes members extending along and secured to opposite sides of each trough section forming reinforcing columns for the conveyer trough and connectors having oppositely inclined engaging faces adapted to engage corresponding inclined surfaces on adjacent ends of adjoining trough sections, within the limits of said column.

Other objects of my invention will appear from time to time as the following specification proceeds and with reference to the accompanying drawing wherein:

Figure 1 is a fragmentary bottom plan view of a shaker conveyer trough line, illustrating one form in which my invention may be embodied;

Figure 2 is an enlarged view in side elevation of adjacent ends of two adjoining troughs of the shaker conveyer trough line shown in Figure 1, with certain parts broken away and certain other parts shown in longitudinal section;

Figure 3 is a sectional view taken substantially along line 3—3 of Figure 2;

Figure 4 is an enlarged transverse sectional view taken through one of the connectors, for connecting the trough sections together; and Figure 5 is an enlarged fragmentary detail view showing a portion of one of the connectors in horizontal section.

In the drawing, a plurality of troughs 10, 10 of a shaker conveyer trough line are herein shown as being connected together in abutting relation with respect to each other by connecting devices, generally indicated by reference characters 11, 11.

The troughs 10, 10 are of the usual construction with a relatively horizontal bottom and outwardly inclined flared sides 12, 12. Reinforcing members, herein shown as being angle irons 13, 13, extend along and are secured to the outer sides of said trough sections on the ends of their legs between the connecting devices 11, 11. Said angle irons, as herein shown, are disposed directly beneath a horizontal shouldered portion 14 of the outwardly flared sides 12, 12 of each trough section. One leg of each angle iron is secured to the underside of said horizontal portion, while the other leg is secured to the outside of the lower portion of the flared side 12. Said angle irons with the outside of said trough sections thus form box-like columns abutting the connecting devices 11, 11 at their ends. The connecting devices 11, 11 are so arranged that when the troughs are connected together, the connecting parts of said connecting devices are disposed within the vertical and lateral limits of said box-like columns so the forces will be taken directly through said connecting devices and columns during reciprocation of the conveyer.

The connecting devices 11, 11 each include a reinforcing and abutting member 15 secured to one end of one trough section, adjacent one end thereof and herein shown as projecting from the end of said trough section a slight distance. Said member extends across the bottom and upwardly along opposite sides of said trough section and, as herein shown, has a lower inwardly recessed shouldered engaging surface 17. Said shouldered engaging surface is adapted to be engaged by a projecting portion 18 of an adjoining reinforcing and abutting member 19, which is secured to an adjacent end of the next adjacent trough section 10, to permit the two trough sections of the conveyer to be connected together in abutting relation with respect to each other. While the trough sections 10, 10 are herein shown as being connected in abutting relation with respect to each other, it should be understood that said connecting devices may be arranged to connect said trough sections in overlapping relationship as well, if desired, without departing from the principles of my invention.

The member 15, as herein shown, has integrally formed rearwardly projecting portions 20, 20, projecting from opposite sides thereof and extending along the associated trough sections in a direction away from the end thereof and abutting the forward ends of and forming continuations of the angles 13, 13. The member 19 is likewise provided with projecting portions 23, 23, extending along the associated conveyer trough in a direction away from the end thereof and engaging the ends of and forming continuations of the angles 13, 13. Said projecting portions, with the outside of said trough sections, thus form continuations of the box-like sections formed by said angles and the outer sides of said trough sections, and are within the vertical and lateral boundaries of said box-like columns, and with said angles form reinforcing columns for each trough section, so arranged that when the trough sections are connected together continuous columns are formed along opposite sides of the trough sections, extending for the entire length of the conveyer trough line.

The projecting portions 20, 20 of the abutting member 15 are each provided with an apertured portion 25, herein shown as having vertically extending sides 26, 26 oppositely inclined from the outer to the inner side of said member. The portions 23, 23 of the abutting member 19 are each provided with a similar apertured portion 27 having oppositely inclined sides 28, 28, similar to the sides of the apertured portion 25. The adjacent sides 26 and 28 of the apertured portions 25 and 27 are adapted to be engaged by corresponding oppositely inclined portions 29, 29 of inwardly projecting ends of a connecting member 30. When said connecting members are positively moved towards the members 15 and 19 and the inclined sides of said connecting member are in engagement with the inclined sides 26 and 28 of said members, a wedge-like connection is formed to draw said trough sections together and hold them in connected relationship.

The means for engaging the projecting sides 29, 29 of the connecting member 30 with the inclined sides 26 and 28 and for holding the trough sections in connected relationship with respect to each other, as herein shown, includes a pair of spaced apart bolts 32, 32, adapted to extend through the projecting portions of said connecting member and threaded in elongated threaded members 33, 33. As herein shown, said threaded members are slotted in a plane perpendicular to the axes of said bolts, and bolts 34, 34 are threaded in one portion of said nut-like members, to tend to close said slots and lock the bolts 32, 32 from turning movement, when the trough sections are connected together.

It may be seen from the foregoing that when the trough sections 10, 10 are arranged in abutting relation with respect to each other, they may be connected together in a simplified manner by engaging the inclined sides 29, 29 of the inwardly projecting portions of the connecting members 30, 30 with the inclined surfaces 26, 26 and 28, 28 of the engaging members 15 and 19, and drawing adjacent ends of the trough sections together by the bolts 32, 32 threaded in the threaded members 33, 33; and when the trough sections are drawn together to the required degree, they may be locked in this relationship by the bolts 34, 34, threaded within said threaded members.

It may likewise be seen that the connecting means for the trough section are in alignment with and within the vertical and lateral boundaries of and form continuations of the box-like sections formed by the outer sides of said trough sections and the angle irons 13, 13, so that when the entire trough line is connected together, the stresses imparted thereto will be taken through said box-like sections and imparted to said connecting devices in alignment with said box-like sections, thus forming continuous columns on opposite sides of the trough sections for the length of the entire trough line, so that the stresses during reciprocation of the conveyer will be taken through the fastening means for the trough sections.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer, a plurality of conveyer trough sections, means for connecting said trough sections in aligned relationship for reciprocation together, and members having longitudinally extending spaced apart edge faces secured to and extending along opposite sides of said trough sections intermediate the tops and bottoms thereof, in alignment with said connecting means and said members with said connecting means and the outsides of said trough sections forming spaced apart columns extending the length of the conveyer.

2. In a shaker conveyer, a plurality of conveyer trough sections, means for connecting said trough sections in aligned relationship for reciprocation together, and means extending along opposite sides of said trough sections intermediate the tops and bottoms thereof, in alignment with said connecting means, to take the stresses imparted to said trough sections during reciprocation of the conveyer including a plurality of longitudinally extending members having longitudinally extending spaced apart edge faces secured to the outer sides of said trough sections, said members with the outsides of said trough sections forming box-like columns extending for the entire length of the conveyer.

3. In a shaker conveyer, a plurality of conveyer trough sections, means for connecting said trough sections in aligned relationship for reciprocation together, and angle irons extending along said trough sections in alignment with said connecting means, said angle irons being disposed intermediate the tops and bottoms of said trough sections and having connection thereto at the ends of their legs, so said angle irons with said trough sections may form box-like reinforcing columns for said trough sections.

4. In a shake conveyer, a plurality of conveyer trough sections, means extending along opposite sides of said trough sections to take the stresses imparted to said trough sections during reciprocation of the conveyer including a plurality of longitudinally extending members having longitudinally extending spaced apart edge faces secured to the outer sides of said trough sections intermediate the tops and bottoms thereof, said members with the outsides of said trough sections forming box-like columns, and connecting means in alignment with and abutted by said members for connecting said trough sections together to form spaced apart continuous columns extending the length of the conveyer trough line.

5. In a shaker conveyer, a plurality of conveyer trough sections, means extending along opposite sides of said trough sections to take the stresses imparted to said trough sections during reciprocation of the conveyer including a plurality of longitudinally extending members having longitudinally extending spaced apart edge faces secured to the outer sides of said trough sections intermediate the tops and bottoms thereof, said members with the outsides of said trough sections forming box-like columns, and connecting means in alignment with and abutted by said members for connecting said trough sections together to form spaced apart continuous columns extending the length of the conveyer trough line including members projecting laterally in opposite directions from adjacent ends of said trough sections, said members having spaced apart oppositely inclined portions disposed within the limits of said longitudinally extending members, and connecting members having spaced apart inwardly extending oppositely inclined faces corresponding with and engageable with said inclined portions, for pulling said trough sections together and for holding said trough sections in connected relation with respect to each other upon positive movement thereof towards said trough sections.

6. In a shaker conveyer, a plurality of conveyer trough sections, angle irons extending along opposite sides of said trough sections, said angle irons being disposed intermediate the tops and bottoms of said trough sections and having connection thereto at the outer ends of their legs, so said angle irons with said trough sections may form reinforcing columns for said trough sections, and means abutting the ends of said angle irons, for connecting said trough sections together including abutting members in alignment with said angle irons and having oppositely inclined portions, and connecting members having spaced apart oppositely inclined engaging portions adapted to engage said first mentioned inclined portions, to hold said abutting members in abutting relation with respect to each other.

7. In a shaker conveyer, a plurality of conveyer trough sections, angle irons extending along opposite sides of said trough sections, said angle irons being disposed intermediate the tops and bottoms of said trough sections and having connection thereto at the outer ends of their legs, so said angle irons with said trough sections may form reinforcing columns for said trough sections, and means abutting the ends of said angle irons for connecting said trough sections together including a pair of members having oppositely inclined portions in alignment with said angle irons, connecting members having spaced apart oppositely inclined portions adapted to engage said inclined portions, and means for moving said connecting members inwardly towards said trough sections for engaging said inclined portions with said sides, to draw adjacent trough sections towards each other and hold said trough sections in connected relation with respect to each other.

8. In a shaker conveyer, a plurality of conveyer trough sections, angle irons extending along said trough sections, said angle irons being disposed above the bottom and below the tops of said trough sections and having connection thereto at the outer ends of their legs, so said angle irons with said trough sections may form reinforcing columns for said trough sections, means abutting the ends of said angle irons for connecting said trough sections together including a pair of abutting members having oppositely inclined portions in alignment with said angle irons, and connecting members having spaced apart inwardly projecting portions with oppositely inclined sides adapted to engage said oppositely inclined portions within the lateral and vertical limits of said angle irons.

9. In a shaker conveyer, a plurality of conveyer trough sections, and angle irons extending along said trough sections, said angle irons being disposed above the bottom and below the tops of said trough sections and being connected therewith at the outer ends of their legs, so said angle irons with said trough sections may form reinforcing columns for said trough sections, means for connecting said trough sections together including a pair of abutting members having oppositely inclined portions, connecting members having spaced apart inwardly projecting portions with oppositely inclined sides adapted to engage said portions in planes intersected by the extended sides of said box-like columns, and means for moving said connecting members inwardly towards said trough section for engaging said inclined sides with said inclined portions, to draw adjacent trough sections together and hold said trough sections in connected relation with respect to each other.

10. A connecting means for a pair of conveyer trough sections including members projecting laterally in opposite directions from adjacent ends of said trough sections, said members having spaced apart oppositely inclined portions, connecting members having spaced apart oppositely inclined engaging faces corresponding with and engageable with said inclined portions, and means for drawing said connecting members towards said trough sections for drawing adjacent ends of said trough sections together by engagement of said inclined faces of said connecting member with said oppositely inclined portions and also for holding the inclined faces of said connecting members in engagement with the inclined portions of said laterally projecting members.

11. A means for connecting a pair of conveyer troughs together including members projecting laterally in opposite directions from adjacent ends of said trough sections, said members having oppositely inclined portions, and connecting members having oppositely inclined faces corresponding with and engageable with said inclined portions of said first mentioned members, for holding said trough sections together, means for holding the inclined faces of said connecting members in engagement with the inclined portions of said laterally projecting members including bolts extending through the ends of said connecting members, and nuts engaging said laterally projecting members and adapted to have said bolts threaded therein.

12. A means for connecting a pair of conveyer troughs together including members projecting laterally in opposite directions from adjacent ends of said trough sections, said members having oppositely inclined portions, and connecting members having oppositely inclined faces corresponding with and engageable with said inclined portions of said first mentioned members, for holding said trough sections together, means for holding the inclined faces of said connecting members in engagement with the inclined portions of said laterally projecting members including bolts extending through the ends of said connecting members, elongated nuts adapted to have said bolts threaded therein, said nuts being slotted in a plane perpendicular to the longitudinal axes of said bolts, and other bolts adapted to be threaded within said nuts, for drawing the slotted portions thereof together and locking said first mentioned bolts from turning movement.

13. Connecting means for a pair of conveyer trough sections having members projecting laterally in opposite directions from adjacent ends of said trough sections, said members including plate sections extending longitudinally of and spaced from said trough sections, said plate sections having spaced apart oppositely inclined portions, and connecting members having spaced apart oppositely inclined faces corresponding with and engageable with said inclined portions of said plate sections, and means for drawing said connecting members towards said plate sections and drawing adjacent ends of said trough sections together including bolts extending through said connecting members, and clamping means carried by said bolts in sliding engagement with the inner faces of said plate sections.

WILLIAM W. SLOANE.